Figures 1, 3:
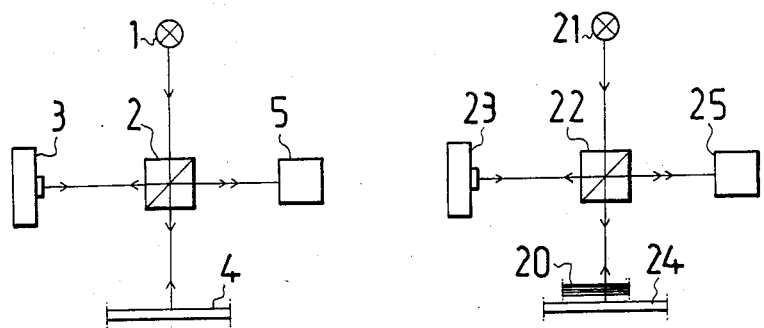

United States Patent [19]

Kalliomäki et al.

[11] Patent Number: 4,647,205
[45] Date of Patent: Mar. 3, 1987

[54] METHOD AND INTERFEROMETER FOR THE MEASUREMENT OF SHORT DISTANCES

[75] Inventors: Kalevi J. Kalliomäki, Espoo; Reijo A. Kivelä; Raimo V. Saarimaa, both of Oulu, all of Finland

[73] Assignee: Topwave Instruments Oy, Helsinki, Finland

[21] Appl. No.: 527,958

[22] Filed: Aug. 31, 1983

[30] Foreign Application Priority Data

Sep. 1, 1982 [FI] Finland .................. 823028

[51] Int. Cl.$^4$ .......................................... G01B 11/02
[52] U.S. Cl. .............................................. 356/357
[58] Field of Search ............. 356/357, 355, 356, 358, 356/345, 361, 346

[56] References Cited

U.S. PATENT DOCUMENTS 3,319,515 5/1967 Flournoy .................. 250/559 X
3,563,663 2/1971 Barringer ..................... 356/346

OTHER PUBLICATIONS

Flournoy et al., "White Light Interferometric Thickness Gauge", Applied Optics, vol. 11, No. 9, Sep. 1972, pp. 1907–1915.

Primary Examiner—Davis L. Willis
Attorney, Agent, or Firm—Birch, Stewart, Kolasch & Birch

[57] ABSTRACT

A method and apparatus for the measurement of short distances by means of an interferometer using incoherent light is described. An incoherent beam of light is transmitted via a beam-splitter (2) both to the reference point (3) and to the object (4) to be measured, and the position of the reference device is adjusted until interference is detected, at which time the distances passed by the beams are equal. The position of the reference device (3) is adjusted periodically by means of an automatic actuating device, which may be, e.g., a mirror attached to a loudspeaker mechanism, and the interference is detected by means of an electronic detector (5), as well as, at the moment of interference, the position of the actuating device is read, e.g., on the basis of the momentary value of the supply signal controlling the actuating device. By regularly monitoring the timing of the repeated interference moments in relation to the movement of the actuating device, it is possible, after calibration of the apparatus, to observe the changes in the position of the object (4) to be measured continuously.

2 Claims, 3 Drawing Figures

METHOD AND INTERFEROMETER FOR THE MEASUREMENT OF SHORT DISTANCES

The present invention is concerned with a method for the measurement of short distances by means of an interferometer using incoherent light, in which interferometer the incoherent beam is transmitted via a beam-splitter, on one hand, to the object whose location is to be determined and, on the other hand, to a reference device, and the beams of light reflected from the object as well as from the reference device are received by means of an interference detector, which detects the interference when the distances from the reference device and from the object to the beam-splitter are equal. The invention is also concerned with an interferometer intended for the performance of the method.

The thickness of thin films, coatings, sheets, etc. can be measured by means of mechanical measuring means if the object to be measured is sufficiently hard. If local variations in thickness of coatings are of significance, such as in an examination of electronic hybrid circuits, the measurement point must be of a small size, whereby its surface pressure increases and prevents the measurement of a soft material. Coating materials are often soft at the initial stage of the process until they have had time to harden. In view of the control of a process, it would be important to receive information on the thickness of the film as soon as possible.

By means of optical means of measurement, it is possible to measure the thickness of a film without damaging it. The precision of conventional optical rangefinders based on angle measurement is, however, often insufficient, being only of the order of 10 $\mu$m. An interferometer that employs monochromatic light is sufficiently precise, but therein the interference always occurs after each half wavelength as identical, whereby an error of the distance of a multiple of half wavelength readily arises. By using several different precisely known wavelengths or by changing the wavelength within a precisely known range, it would be possible to avoid the ambiguity of the result given by a conventional interferometer. With the present-day stand of technology, an apparatus constructed in accordance with these principles, however, becomes excessively expensive.

If, in a conventional interferometer, white light is used in stead of monochromatic light, the interference becomes unambiguous, i.e., interference occurs only when both beams of light have travelled exactly the same distance (Michelson interferometer). This principle was employed by Prof. Väisälä for the comparison of length in the quartz-meters produced by him. The Institute for Geodesy applies this method discovered by Väisälä for the comparison of distances of a length up to half a kilometer. A problem in this method is the finding of the interference; the setting and tuning of the equipment may take several days of the working time of a professionally skilled person. In view of this, it is understandable that the method of Väisälä has not become widely popular.

If the film or coating to be measured is transparent, its thickness can be measured precisely by means of a modification of the Michelson interferometer that uses white light, suggested by Flournoy, McClure and Wyntjes in 1972. In the method concerned, the beam of light is reflected from the front face and from the rear face of the film to be measured, and the beams are then passed into the interferometer, whereby the thickness of the film is found out by displacing the mirror of the interferometer. The distance between the film and the interferometer does, in principle, not affect the result. The index of refraction of light in the film and the angle of the beams of light cause inaccuracy of measurement.

In the present invention, a modification has been made of the Michelson type interferometer, which operates automatically and is suitable for the measurement of thickness of thin, non-transparent films etc. By means of purposeful functions of optical, electronic and electro-mechanical components, it has been possible to eliminate the most important drawback of the original apparatus: the slowness. An essential difference of the present method and apparatus, as compared with the prior art, is also the fact that, as the measurement result, the length of the continuously adjustable reference distance is indicated at the moment at which the interference is detected.

The method in accordance with the invention is characterized in that the reference distance or the distance to be measured is adjusted periodically by means of an automatic mechanism, the interference is monitored by means of an electronic interference detector, and, at the moment of interference, the position of the reference device or of the object to be measured is read from a position indicator or equivalent placed in connection with the automatic mechanism. The shifting mechanism can be calibrated appropriately by means of a second interferometer.

Thus, the interferometer in accordance with the invention, intended for the measurement of short distances, is of the type which comprises a source of light transmitting incoherent light, a beam-splitter for splitting the beam coming from the source, on one hand, to the reference device and, on the other hand, to the object to be measured, an interference detector for receiving the reflected beams of light coming from the reference device and from the object, as well as means for adjusting the position of the reference device, and this interferometer is characterized in that said means for adjusting the position of the reference device comprise a periodically operating automatic mechanism, which produces a periodical change in the reference distance, preferably at a constant velocity, that the interference detector is electronically operating and so connected to the said automatic mechanism that, at the moment of interference, it is possible to read the position of the mechanism and, along with the position, also the reference distance.

Figure 2:
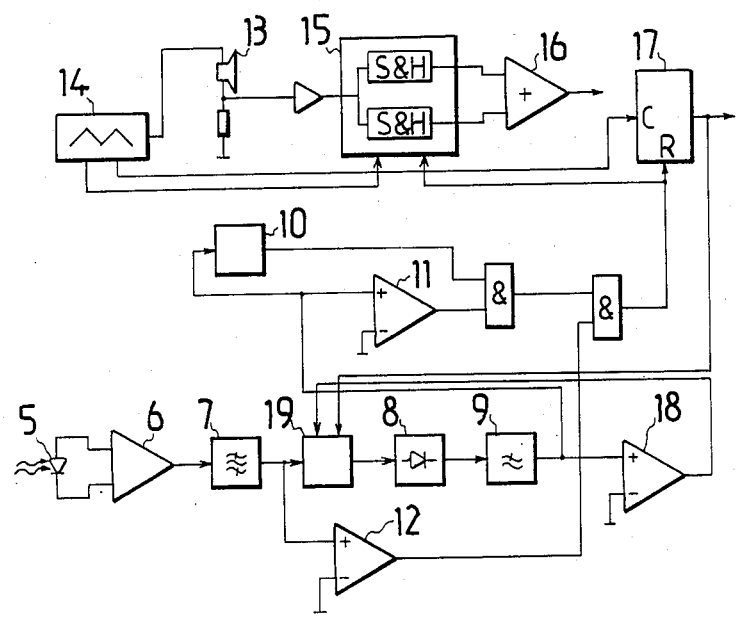

The invention will be described in more detail below by way of examples and with reference to the attached drawings, wherein FIGS. 1 and 3 are schematical presentations of the principle of the interferometer using incoherent light, and FIG. 2 shows an embodiment of an apparatus in accordance with the present invention.

The source of light 1 in the apparatus is an incandescent lamp. It is also possible to use a light-emitting semiconductor diode LED. An essential feature of the source of light is a wide spectral band, i.e., monochromatic light is not suitable. Moreover, a high and uniform intensity is required. As a beam-splitter 2, it is possible to use a beam-splitter prism, a semi-transparent mirror, etc. The optical quality of the beam-splitter is important. The splitting ratio may also be different from 1:1. From the beam-splitter, one beam of light passes to the object 4 to be measured, and the other one to the reference device 3, which is provided with an electro-mechanical actuating device (not shown in FIG. 1) for the adjustment of its position and so also of the reference distance. According to the invention, this distance is adjusted, in the way to be described below, by means of an actuating device moving back and forth periodically and as uniformly as possible. The distance may also be adjusted optically, e.g., by means of a pivotable glass plate. A simple electro-mechanical actuating device is a loudspeaker mechanism, to whose mobile membrane the mirror is fastened. By means of lenses, a sufficient intensity of light and small size of the point of measurement light are obtained. The beams of light reflected from the mirror related to the reference distance and from the object 4 to be measured, which have travelled an equally long distance, are passed to the detector 5. As the detector, it is possible to use an ordinary silicon photodiode.

Making now reference to FIG. 2, the signal received from the detector 5 is amplified by means of an amplifier 6 and passed to a band-pass filter 7. This is possible, because the frequency of the interference is constant owing to the stable velocity of the reference mirror. Since the interference is very short, typically only of a length of about six sine cycles, the Q-value of the band-pass filter 7 must be about three. By means of the filter, it is possible to attenuate, e.g., disturbances derived from the general lighting. The interference pulse is rectified 8 and filtered by means of a low-pass filter 9. The initial moment of the envelope pulse obtained is indicated. Since the amplitude of subsequent pulses may vary within wide limits, a so-called constant-fraction detector 10 is used. Error pulses produced by noise are excluded by means of a minimum-limit comparator 11, i.e., the amplitude of a pulse must exceed a certain set constant value for it to be accepted.

More precise timing of the interference moment is performed by means of a zero-surpassing comparator 12 of the interference signal. This comparator monitors the next surpassing of zero after the interference moment indicated by the constant-fraction detector. The outputs of constant-fraction detector 10 and minimum-limit comparator 11 are connected to the two inputs of a first AND gate. The output of the first AND gate is connected to one input terminal of a second AND gate. The other input terminal is connected to the output of zero-surpassing comparator 12. The output of the second AND gate is connected to an input terminal of counter 17 and sampling and holding elements 15.

As an actuating means adjusting the reference distance, in the embodiment described, a loudspeaker 13 provided with a mirror is used, which is supplied from a triangular-wave generator 14. If necessary, the zero position of the loudspeaker may be changed by summing a slight DC-component with its supply voltage. At the interference moment detected, the voltage proportional to the position of the actuating means is stored in the sampling and holding elements 15, in which the storage takes place alternatingly depending on the direction of movement of the actuating device. By averageing the voltage of the sampling and holding elements by means of a summing amplifier 16, any effect of possible hysteresis of the actuating device on the measurement result is eliminated. From the output of the summing amplifier, a voltage proportional to the distance to be measured is obtained. A counter 17 counts the number of cycles of the actuating device. The counter is reset to zero at the moment of detection of interference, whereby it functions as an indicator of the missing interferences.

The maximum amplitude of the envelope of the interference pulse is monitored by means of a peak value indicator 18. When the maximum value surpasses a set value, information on this is obtained.

The data obtained from the indicator of the missing interferences and from the maximum-value indicator are used for controlling the attenuator 19 (attenuation about 20 to 30 dB), whose function is to attenuate the interference signal measured from a good surface so as to reduce the dynamics required from the electronics.

It is an advantage of the apparatus described that the distance which is often difficult to measure is converted to a readily measurable reference distance. The measurement is successful best from a smooth glossy surface. An unevenness of the surface weakens and prolongs the interference, which may be used as a measure of the smoothness of the surface.

The resolution power of the apparatus is, in principle, better than $\lambda/8$, i.e. about 100 nm at an average wavelength of 0.9 $\mu$m. The range of measurement is limited by the requirement of speed and by the actuating device adjusting the reference distance. An example value is a measurement velocity of 1 mm per second, which may, if necessary, be accelerated at the expense of noise, depending on the surface to be measured by 1 to 2 decades.

Another interferometer application is the thickness measurement of thin, transparent multi-layer plastic films. As shown in FIG. 3 (where the reference numerals 21, 22, 23, and 25 correspond to the reference numerals 1, 2, 3, and 5, respectively, of FIG. 1), the multi-layer film 20 is placed in front of the back mirror 24 (the film may be in a moving state). Due to the measurement principle, at least three interferences are obtained: one from the front face of the film, another from the rear face thereof, and one from the mirror 24. In addition, there will probably be interferences of a higher order. Since the interferences of the front and rear faces of the film do not appear simultaneously, the film usually moves over a considerable distance during the interference interval. If, now, the thickness information were to be calculated from the difference between the front and rear face interferences, the movement in the direction of the film measurement beam would cause an error in the result. This error can be avoided by using the displacement of the interference of the mirror, caused by the film, for the momentary thickness measurement. The location of the interference caused by the mirror is stored in the memory of the measurement means when the film is outside the beam. The displacement of the interference, caused by the film equals to $(n-1)\cdot d$, where n is the refraction index of the film and d is the thickness thereof. The difference between the interference distances of the front and rear faces of the film is correspondingly $n\cdot d$, but this measurement is sensitive to the movement of the film in the beam direction. By calculating average values of measured $n\cdot d$ values, it is possible to measure the average thickness in this way too. It is, however, preferable to use the information so obtained for the calculation and control of the refraction index. From the above-mentioned two equations with two unknown quantities, it is obviously possible to determine both the thickness and the refraction index of the film.

The back mirror does not have to be of high quality. It is only essential that its straightness and smoothness correspond to the desired measurement accuracy. The optical reflection index might even be small, e.g., 10 percent, whereas a high quality mirror surface might even cause problems as the direction of the surface in that case is very critical.

Multiple reflections within the film and between the mirror and the film cause interferences of a higher order. These might be so strong that they cannot be eliminated by means of the amplitude value. Due to the longer optical distance, the higher order interferences may easily be separated from the interferences of the front and rear face of the film but the determination of the interference of the mirror might get mixed up. If the air gap between the film and the mirror has a width of n·d, the situation is difficult as then the interference of the mirror and the interference caused by the internal reflection of the film coincide. In order to avoid this, it is advisable to do as follows when thin and thick films are concerned: if the film is thicker than 100 μm, the film is placed as close to the mirror as possible, the acceptable air gap having a width substantially corresponding to the thickness of the film. Hence, the most important interference caused by the mirror is easy to locate as it lies third on the distance scale (next to the interference of the rear face) and, at any rate, after the reference interference of the mirror.

When thin films are concerned, the air gap should be wide, e.g., 400 μm. This value, however, is not critical: any value between 200 and 600 μm may be chosen. The upper limit is determined by the focal distance of the interferometer optics, i.e., the sharpness of the measurement point in the depth direction. At the lower limit, on the other hand, problems due to higher order interferences may arise, the evaluation of which is likely to be erroneous. If the air gap is feasible, the interference caused by the back mirror will be the first and probably only one after the reference distance of the back mirror.

In multi-layer plastic films, the interferences caused by the intermediate layers can be observed quite often. Although the amplitude of the interferences is small, it still is sufficient for the measurement of the thickness of said intermediate layers. The fact that also small reflections can be observed by means of the interferometer is due to the constant reference beam. The output of the interference detector diode is proportional to the product of the reference beam and the beam reflected from the object to be measured. As the reference value is constant, this results in a wide dynamic measurement range, the order being 1:1000 defined as a fluctuation of the reflection index. In most other interferometers, also the reference beam is reflected from the surfaces to be measured whereby the dynamic range substantially decreases, being, e.g., 1:30.

In the measurement of multi-layer plastic films, the intermediate layers cannot be observed in every point. This, however, does not cause too much harm as the plastic film can be moved, or it moves, such that points favorable to measurement regularly appear. As a result, the average thicknesses of the intermediate layers can be obtained. As to the measurement distance of multi-layer plastic films, the same applies as for the single-layer plastic films.

In the practical application of the interferometer, the measurement electronics must receive information concerning the quality of the surface, of the plastic film, etc. and a rough estimate of the expected thickness or of the variations in the surface elevation, The minimum number of expected interferences is a suitable information to indicate the mode. When the profile of transparent surfaces is measured, only one interference is expected and the corresponding mode is MODE 1. If a transparent film is sandwiched on top of a non-transparent film, two interferences are to be expected: one from each face of the film. The corresponding mode in this case is MODE 2. In the case of single-layer plastic films, three interferences are correspondingly to be expected in addition to potential higher order interferences, the corresponding mode being MODE 3. In the case of multi-layer films, at least four substantial interferences are to be expected, the mode being MODE 4. If the number of interferences observed does not correspond to the given number, the interferometer is arranged to warn the operator to check the mode or sample.

By dividing the measurement in different modes and by choosing the measurement distance in accordance with the rough thickness information, the data program to be employed can be made reliable and simple. The number and location of expected interferences thus are internally defined for the apparatus before starting the measurements.

What is claimed is:

1. An apparatus for the measurement of the thickness of an object by means of an interferometer comprising:
   means for transmitting a beam of incoherent light via a beam splitter along a first path to the object and along a second path independent of said first path to a reference device;
   means for directing the beams of light reflected from the object as well as from the reference device to an interference detector means which detects interference between the beams of the first and second paths when the distances of the object and the reference device to the beam splitter are equal;
   means for adjusting the distance of the reference device from the beam splitter by moving the device periodically and at a constant velocity over a measurement range including an electromagnetically driven loud speaker having a coil and movable membrane, said reference device being a mirror mounted on the membrane, said speaker being driven to move said membrane and mirror thereon over said measurement range by a periodic sawtooth voltage applied to said coil which imparts a constant velocity to said membrane and mirror;
   said interference detector means generating an interference envelope signal when an interference exists between the beams in said first and second paths;
   position detector means responsive to said interference envelope signal for detecting the position of said reference device at the time said interference envelope signal is generated;
   band-pass filter means for receiving and passing said interference envelope signal and blocking the passage of ambient light signals outside of a predetermined frequency band;
   rectifier means for recitifying interference envelope signals passed by said band-pass filter means to create envelope pulses;
   threshold detector means for passing envelope pulses above a predetermined minimum level;
   zero passage detector means for receiving envelope signals passing through said band-pass filter means and detecting any crossings of the envelope signals through a zero voltage reference; and
   AND gate means having a first input terminal connected to an output of said threshold detector means and a second input terminal connected to an output of said zero passage detector means, said AND gate means generating a control output signal when envelope pulse signals are present on said first input terminal and when zero crossing signals are present on said second input terminal;

said position detector means being responsive to said control output signal to detect the position of said reference device;

whereby the thickness of the object may be determined as a function of the position of the reference device.

2. The apparatus of claim 1 wherein said position detector means includes a sample and hold circuit responsive to said control output signal from said AND gate means.

* * * * *